(12) United States Patent
Ali et al.

(10) Patent No.: US 8,860,441 B2
(45) Date of Patent: Oct. 14, 2014

(54) ELECTRONIC DEVICE WITH BIOMETRIC MODULE

(75) Inventors: Valiuddin Y Ali, Cypress, TX (US); Jeffrey A. Lev, Cypress, TX (US); Paul J. Doczy, Cypress, TX (US); Jeffrey C. Parker, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2296 days.

(21) Appl. No.: 11/799,271

(22) Filed: Apr. 30, 2007

(65) Prior Publication Data

US 2008/0267457 A1 Oct. 30, 2008

(51) Int. Cl.
*G01R 27/26* (2006.01)
*G06K 9/00* (2006.01)

(52) U.S. Cl.
CPC .................. *G06K 9/00053* (2013.01)
USPC ......................... 324/678; 382/115

(58) Field of Classification Search
USPC ........................................................ 324/678
See application file for complete search history.

(56) References Cited

U.S. PATENT DOCUMENTS

| | | | |
|---|---|---|---|
| 6,522,773 B1* | 2/2003 | Houdeau ...................... | 382/124 |
| 6,731,779 B2* | 5/2004 | Satoh .......................... | 382/124 |
| 7,399,931 B2* | 7/2008 | Ball ............................. | 174/355 |
| 2003/0063445 A1* | 4/2003 | Fischbach et al. ............ | 361/752 |
| 2004/0195664 A1* | 10/2004 | Chiu ............................ | 257/676 |
| 2005/0111707 A1 | 5/2005 | Bohn et al. | |
| 2005/0181828 A1* | 8/2005 | Silfverberg ................... | 455/557 |
| 2006/0093191 A1* | 5/2006 | Neil et al. .................... | 382/124 |
| 2007/0146117 A1* | 6/2007 | Slevin ......................... | 340/5.53 |
| 2008/0187191 A1* | 8/2008 | Huang et al. ................. | 382/124 |

FOREIGN PATENT DOCUMENTS

JP 2001056852 A * 2/2001

* cited by examiner

*Primary Examiner* — Melissa Koval
*Assistant Examiner* — Daniel Miller

(57) ABSTRACT

An electronic device comprises a biometric module having a contact-based sensor configured to capture a biometric image, the biometric module configured to discharge electrostatic energy from a user of the biometric module before activating the sensor.

23 Claims, 4 Drawing Sheets

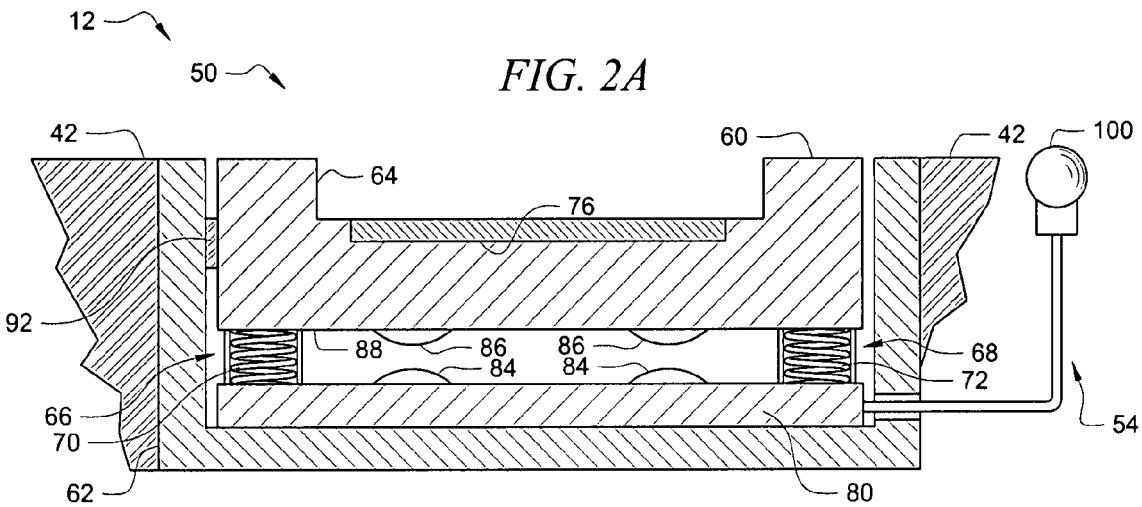
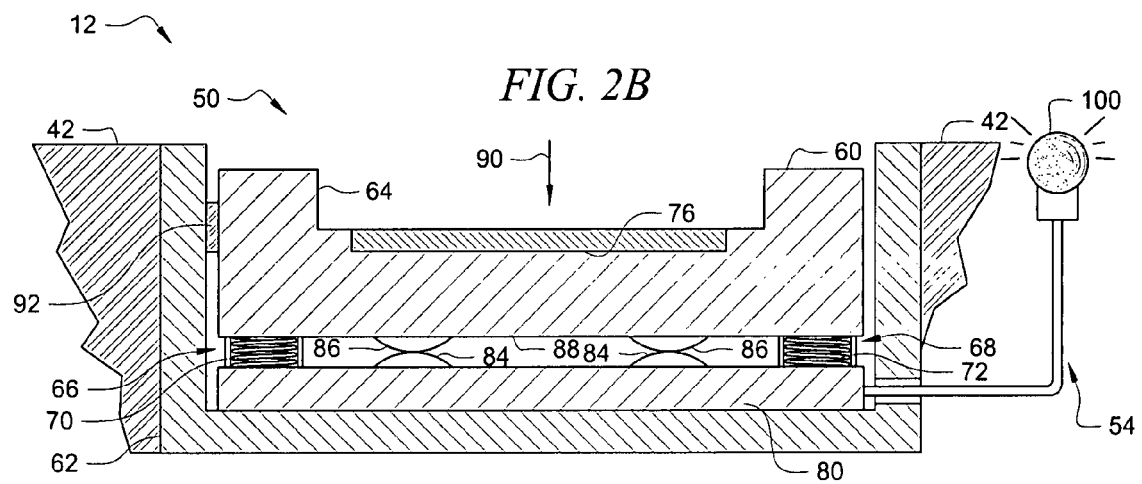

ELECTRONIC DEVICE WITH BIOMETRIC MODULE

BACKGROUND

Biometric modules, such as fingerprint scanners, may be used to authenticate the identity of a user before granting access to the user to an electronic device or other secure resource. However, if the user inadvertently brushes against the biometric module, a scanning operation may be initiated which may yield a negative result and adversely impact the user's continued and/or interrupted use of the resource. Further, biometric modules are susceptible to receiving an electrostatic energy discharged therethrough by a user of the biometric module, thereby causing damage to the biometric module.

BRIEF DESCRIPTION OF THE DRAWINGS

FIGS. 2A-2D are diagrams illustrating side view embodiments of the biometric module of FIG. 1 taken along the line 2-2 of FIG. 1.

DETAILED DESCRIPTION OF THE DRAWINGS

Figure 1:
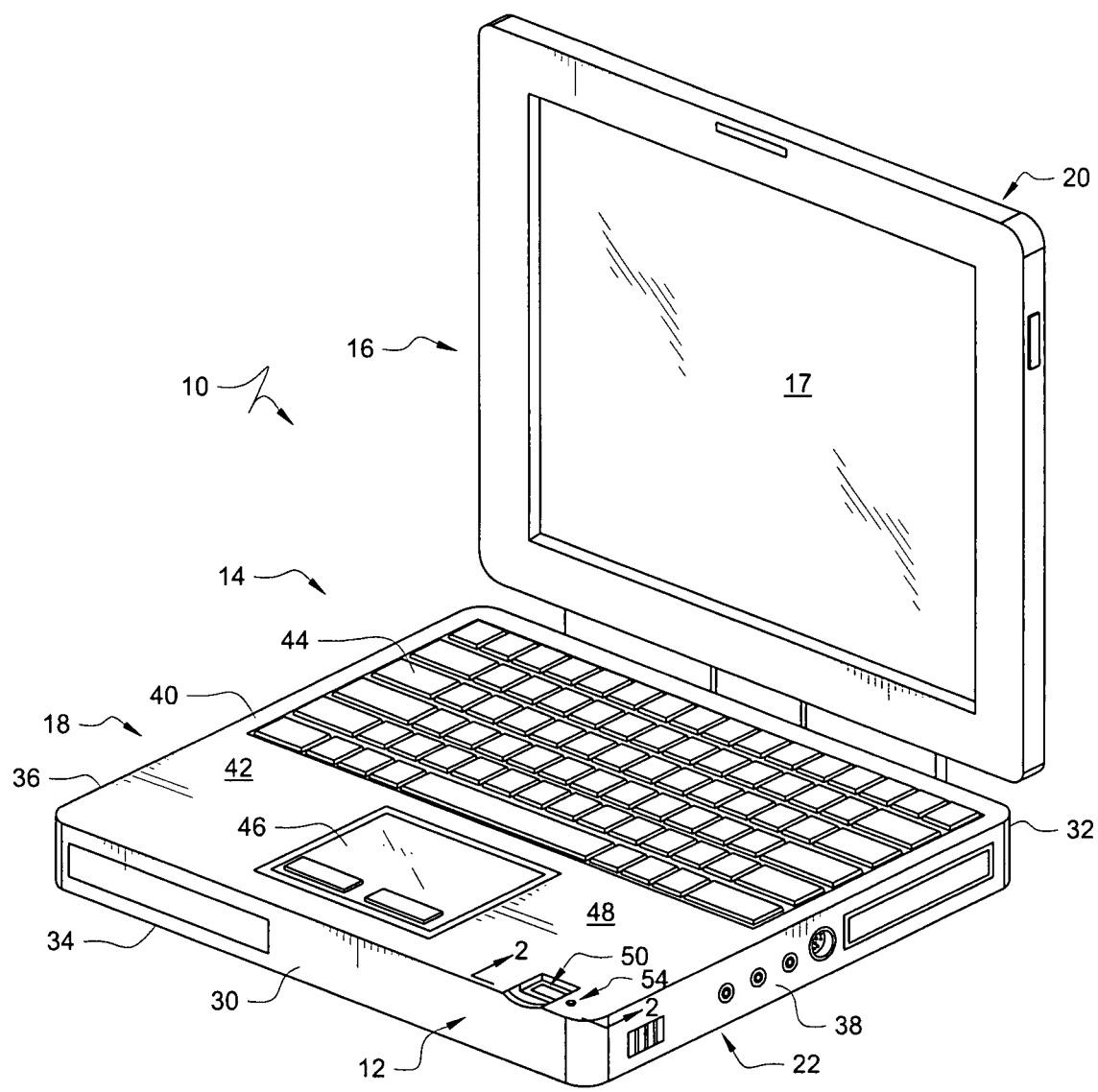
FIG. 1 is a diagram illustrating an electronic device in which an embodiment of a biometric module is employed to advantage.

FIG. 1 is a diagram illustrating an electronic device 10 in which an embodiment of a biometric module 12 is employed to advantage. In the embodiment illustrated in FIG. 1, electronic device 10 comprises a notebook computer 14 having a display member 16 with a display screen 17 rotatably coupled to a base member 18. However, it should be understood that biometric module 12 may be used with other types of electronic devices 10 such as, but not limited to, a table computer, a personal digital assistant, a gaming device, a media player, a desktop computer, or any other type of portable or non-portable computing and/or data processing system.

In the embodiment illustrated in FIG. 1, display member 16 and base member 18 each comprise a housing 20 and 22, respectively, for supporting and/or otherwise housing various components of electronic device 10. Each of housings 20 and 22 are formed of a number of walls. For example, in FIG. 1, housing 22 comprises a front wall 30, a rear wall 32, a bottom wall 34, a pair of side walls 36 and 38, and a top wall 40 defining a working surface 42. Working surface 42 generally comprises one or more elements to facilitate user interaction with electronic device 10. For example, in the embodiment illustrated in FIG. 1, working surface 42 comprises a keyboard 44 and a touchpad interface 46. However, it should be understood that other and/or different elements may be disposed on working surface 42. In the embodiment illustrated in FIG. 1, biometric module 12 is located in a palm rest area 48 of working surface 42 such that palm rest area 48 generally comprises a portion of working surface 42 located in contact with and/or near a user's palms when utilizing keyboard 44 and/or other elements of electronic device 10.

Biometric module 12 is used to generate a biometric image associated with a user of electronic device 10 for authentication, security or other purposes. In the embodiment illustrated in FIG. 1, biometric module 12 comprises a swipe-scanner 50 for generating a fingerprint image of a user. However, it should be understood that biometric module 12 may be configured for other types of biometric data acquisition. Additionally, it should be understood that, regarding fingerprint data acquisition, other types of image acquisition elements may be used such as, but not limited to, contact-based sensors that acquire a biometric image while a user's finger remains stationary. In the embodiment illustrated in FIG. 1, biometric module 12 also comprises at least one indicator 54 disposed adjacent swipe-scanner 50 to display at least one status indication associated with biometric module 12. For example, indicator 54 may be used to indicate to the user that biometric module 12 is powered and/or ready to perform a biometric image acquisition operation, whether or not a biometric image acquisition operation was successful, and/or whether or not the acquired biometric image matched a stored and/or authorized biometric image. However, it should be understood that indicator 54 may be used for displaying other types of status information.

FIGS. 2A and 2B are diagrams illustrating a side view of biometric module 12 taken along the line 2-2 of FIG. 1. In the embodiment illustrated in FIGS. 2A and 2B, biometric module 12 comprises a movable and/or depressible hood 60 and a frame 62. In FIGS. 2A and 2B, hood 60 comprises a downwardly directed recessed area 64 for receiving the swiping movement of a user's finger. However, it should be understood that in some embodiments, hood 60 may be configured without recessed area 64. In the embodiment illustrated in FIGS. 2A and 2B, biometric module 12 comprises biasing elements 66 and 68 used to bias hood 60 upwardly to an undepressed or un-actuated position as illustrated in FIG. 2A. In FIGS. 2A and 2B, biasing elements 66 and 68 comprise spring elements 70 and 72, respectively. However, it should be understood that biasing elements 66 and 68 may comprise other types of devices such as, but not limited to, spring clip elements, compressible elastomer elements or otherwise. In FIGS. 2A and 2B, two biasing elements 66 and 68 are illustrated; however, it should be understood that a greater or fewer quantity of biasing elements may be used.

In the embodiment illustrated in FIGS. 2A and 2B, a sensor 76 of swipe-scanner 50 is disposed in an upper portion of hood 60 to facilitate contact therewith by a user during a finger swiping operation relative to biometric module 12. Swipe-scanner 50 and/or sensor 76 generally comprises a silicon-based semiconductor element for capturing and/or otherwise acquiring a biometric image of a user's finger as the user swipes his/her finger across and in contact with sensor 76. In FIGS. 2A and 2B, biometric module 12 comprises a circuit board 80 disposed beneath and/or below hood 60 and having conductive contacts 84 disposed thereon for communicatively engaging corresponding contacts 86 disposed on a bottom surface 88 of hood 60 facing circuit board 80. In FIGS. 2A and 2B, based on the viewing direction of FIGS. 2A and 2B, only two contacts 84 and two contacts 86 are visible; however, it should be understood that a greater or fewer number of contacts 84 and 86 may be provided (e.g., a ground contact, a power contact, and at least two universal serial bus (USB) contacts).

Referring to FIGS. 2A and 2B, in operation, circuit board 80 is configured to provide power and/or otherwise activate swipe-scanner 50 and/or sensor 76 in response to downward movement of hood 60 from the position indicated in FIG. 2A to the position illustrated in FIG. 2B and engagement of contacts 86 with contacts 84. For example, to perform a fingerprint swipe and/or scan operation, a user of biometric module 12 places a desired finger onto hood 60 and depresses hood 60 in the direction indicated by arrow 90 (FIG. 2B). The downward application of force by the user's finger in the direction indicated by arrow 90 causes hood 60 to move downwardly causing contacts 86 to engage and/or otherwise contact contacts 84 of circuit board 80. The engagement of contacts 84 with contacts 86 enable power, ground, and other signal communications between circuit board 80 and sensor 76 to facilitate activation of sensor 76 to capture and/or otherwise acquire fingerprint image information. In some embodiments, biasing elements 66 and 68 are configured having a predetermined compression resistance to obtain a desired contact force between a user's finger and sensor 76 to obtain a satisfactory biometric scan. In this embodiment, biometric module 12 provides a level of tactile and/or sensory feedback to assist and/or train the user to provide a requisite level of force and swiping action to obtain a biometric scan. For example, biasing elements 66 and 68, alone or in combination with indicator 54, ensure that a satisfactory amount of force is applied to obtain a desired level of skin contact and, in response to contacts 84 and 86 being brought into engagement with each other, indicator 54 is usable to provide a visual indication to the user that the downward force and corresponding swiping action yielded a satisfactory scan. Such training aspects provided by biometric module 12 may be explicit (e.g., using a software or other application of electronic device 10 as a training session) or implicit (e.g., the user educating himself/herself through repeated use of biometric module 12). After a user has completed a swiping operation of the user's finger across sensor 76, biasing elements 66 and 68 cause hood 60 to return to the position indicated in FIG. 2A.

Thus, embodiments of biometric module 12 prevent and/or substantially eliminate inadvertent biometric scanning operations to be performed by electronic device 10 that may otherwise be performed if a user inadvertently touches biometric module 12. For example, as illustrated in FIGS. 2A and 2B, to activate sensor 76 and perform a biometric scanning operation, hood 60 is depressed and/or otherwise moved downwardly until contacts 84 and 86 are engaged, thereby causing activation of sensor 76. Biometric image information is communicated from sensor 76 through contacts 84 and 86 and circuit board 80 to various hardware, software, and/or firmware components of electronic device 10 for processing. Thus, in operation, to activate a biometric scanning operation, hood 60 is moved to a position below working surface 42 before an activation of sensor 76 occurs. Thus, in some embodiments, sensor 76 is activated to acquire a biometric image after sensor 76 is located and/or otherwise moved to a position that is below working surface 42 by some predetermined distance, thereby substantially preventing inadvertent scanning operations.

In the embodiment illustrated in FIGS. 2A and 2B, hood 60 is conductively coupled to frame 62 via a conductive element 92, and frame 60 is conductively engaged with a chassis or other grounding element of electronic device 10. Conductive element 92 may comprise a conductive pad coupled to hood 60 that slidably engages frame 60, a wire or other type of conductive element coupling hood 60 to frame 62, or other device configured to create a conductive path from hood 60 to ground while enabling hood 60 to translate and/or move relative to frame 62. Thus, embodiments of biometric module 12 are configured to dissipate and/or discharge electrostatic energy that may be otherwise introduced by a user performing a fingerprint scanning operation before sensor 76 is activated. For example, in operation, in response to a user's finger contacting hood 60 and/or sensor 76, a conductive path to ground is provided via hood 60, conductive element 92, and frame 62, thereby acting to discharge electrostatic energy associated with the user. In some embodiments, conductive element 92 remains in contact with both hood 60 and frame 62 throughout the upward and downward travel of hood 60 such that all and/or a portion of any such electrostatic energy is discharged before activation of sensor 76 (e.g., a significant portion of electrostatic energy may be discharged from the initial contact of the user's finger with hood 60; however, additional electrostatic energy may be continued to be discharged as a user depresses hood 60 downwardly into engagement with circuit board 80). Thus, biometric module 60 is configured to dissipate electrostatic energy that may be introduced by a user before contacts 86 of hood 60 engage contacts 84 on circuit board 80.

Figure 2C:
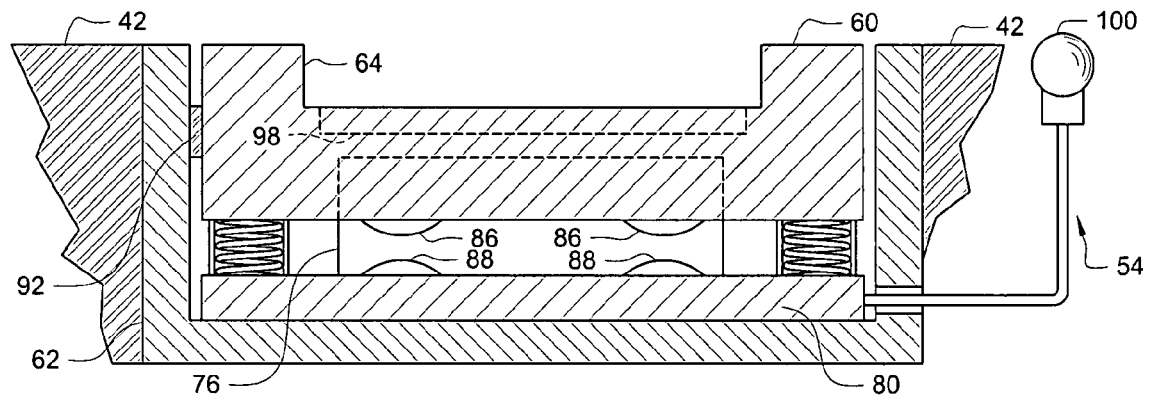
Figure 2D:
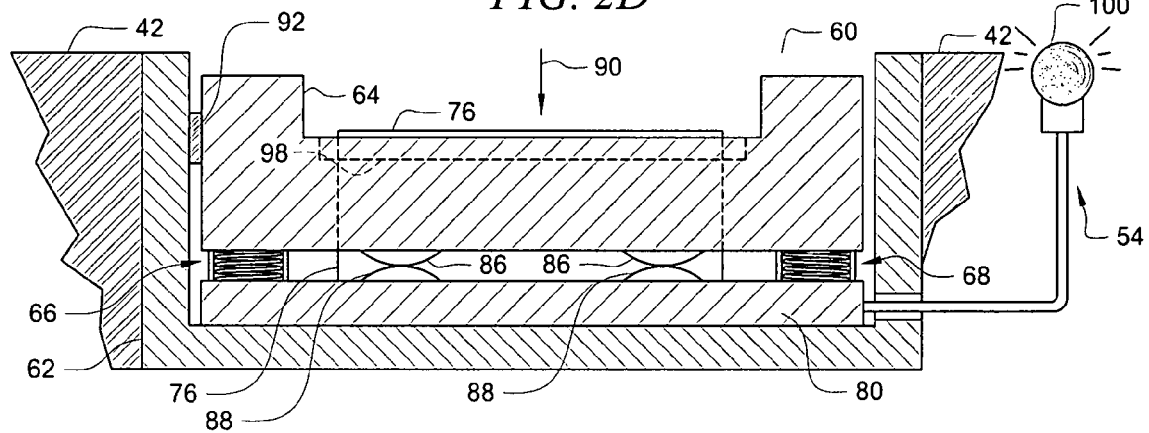

FIGS. 2C and 2D are additional diagrams illustrating another embodiment of biometric module 12 taken along the line 2-2 of FIG. 1. In the embodiment illustrated in FIGS. 2C and 2D, sensor 76 is disposed on circuit board 80, and hood 60 comprises a window 98 that enables a user to contact sensor 76 when hood 60 is depressed to the position indicated in FIG. 2D. For example, in the embodiment illustrated in FIGS. 2C *and* 2D, sensor 76 is located on circuit board 80 to facilitate having sensor 76 in a condition ready to perform a scanning operation (e.g., having power supplied thereto and/or otherwise enabling various drivers or other software components to be loaded and ready to be executed). Thus, in the embodiment illustrated in FIGS. 2C and 2D, to perform a biometric fingerprint scanning operation, a user places his/her finger on hood 60 and depresses hood 60 downwardly in the direction indicated by arrow 90 (FIG. 2D). In response to contact of the user's finger with hood 60, electrostatic energy associated with the user is dissipated and/or otherwise discharged via hood 60, conductive element 92 and frame 62 before the user's finger comes into contact with sensor 76. Continued downward movement of hood 60 enables sensor 76 to extend into and/or through window 98 to facilitate contact therewith by the user's finger. For example, downward movement of hood 60 enables sensor 76 to extend into window 98 and be positioned flush with and/or extend slightly above hood 60 to facilitate contact therewith by a user. Further, in response to further downward movement of hood 60 in the direction of arrow 90 causes contacts 84 and 86 to engage, thereby causing actuation and/or activation of the image capture process (e.g., by virtue of a contact switch or otherwise). Thus, in the embodiment illustrated in FIGS. 2C and 2D, electrostatic energy that may be associated with a user is substantially dissipated and/or discharged before a user's finger contacts sensor 76, thereby substantially preventing or eliminating electrostatic energy discharge damage to sensor 76.

Referring to FIGS. 2A-2D, indicator 54 is coupled to circuit board 80 and, as described above, is used to display and/or otherwise indicate to a user status information associated with biometric module 12. For example, in some embodiments, indicator 54 comprises a light emitting diode (LED) 100. LED 100 may comprise a single-color LED, a multi-color LED, an LED array, or other type of illumination device. Indicator 54 may be used in a variety of different manners to provide a user with a status indication associated with biometric module 12. For example, in some embodiments, a different color may be emitted and/or illuminated by indicator 54 to signify that biometric module 12 is ready to perform a biometric image acquisition operation, a successful or unsuccessful image capture, and/or a match or mismatch of a captured image with a stored authentication image. In other embodiments, indicator 54 may be configured to blink intermittently and/or blink intermittently at different intervals or frequencies to signify different status indications. Thus, it should be understood that indicator 54 may be configured to provide and/or otherwise display such status indications in a variety of different manners.

Figure 3A:
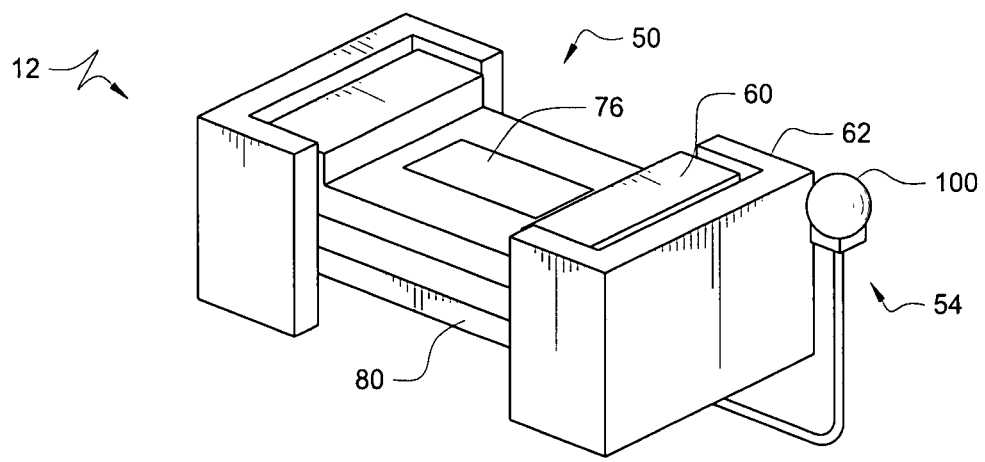
FIGS. 3A and 3B are additional diagrams illustrating the biometric module of FIG. 1.
Figure 3B:
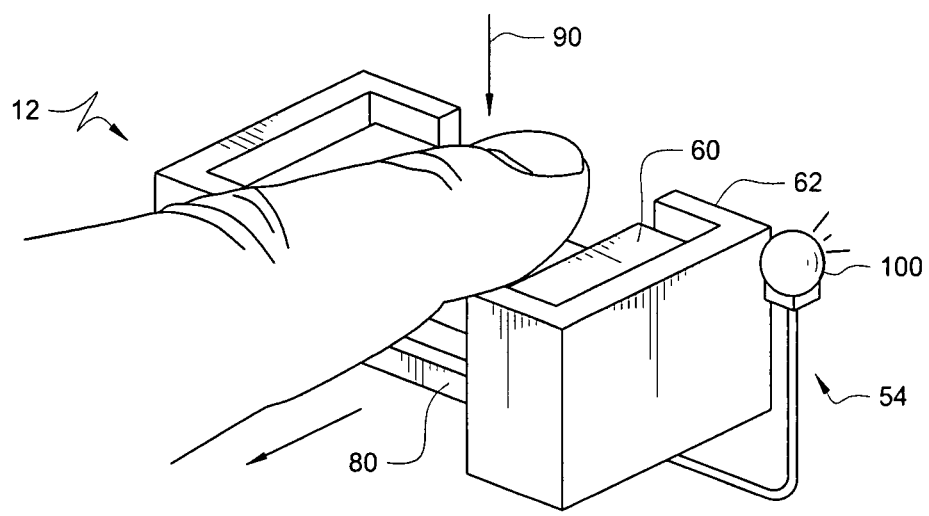

FIGS. 3A and 3B are additional diagrams illustrating biometric module 12 of FIG. 1. In operation, a user places his/her finger against hood 60 and presses downwardly in the direction of arrow 90 (FIG. 3B). In response to the downward force applied by the user, hood 60 moves downwardly until contacts 84 and 86 are in engagement (FIGS. 2A-2D), at which time sensor 76 is activated to capture a biometric image. Further, as described above, electrostatic energy that me be otherwise introduced by the user is discharged/dissipated to substantially prevent damage to sensor 76. Thus, embodiments of biometric module 12 may be manufactured to protect against damage that may otherwise result from electrostatic energy introduced by a user. Further, embodiments of biometric module 12 may be manufactured to substantially prevent inadvertent activation of sensor 76 and/or a biometric scan.

What is claimed is:

1. An electronic device, comprising:
a biometric module that captures a fingerprint and includes:
a frame;
a hood movable in the frame and having a first electrical contact on one surface and a sensor on another surface;
a biasing element that biases the hood toward a working surface of the electronic device; and
a circuit board electrically coupled to the sensor, wherein the circuit board provides power to the sensor in response to downward movement of the hood away from the working surface and engagement of the first electrical contact with a second electrical contact.

2. The device of claim 1, wherein the circuit board includes the second electrical contact.

3. The device of claim 1, wherein the hood and the frame are electrically conductive, and electrostatic energy is discharged through the hood and the frame and to ground while the hood translates in the frame away from the working surface.

4. The device of claim 1, wherein the biasing element is located between the hood and the circuit board.

5. The device of claim 1, wherein the engagement of the first electrical contact with the second electrical contact activates the sensor to capture the fingerprint.

6. The device of claim 1, further comprising an indicator adjacent the sensor, wherein the indicator illuminates when the first electrical contact contacts the second electrical contact.

7. The device of claim 1, wherein biometric image information of the fingerprint communicates from the sensor through the first and second electrical contacts and to the circuit board.

8. The device of claim 1, wherein the biometric module comprises an indicator disposed adjacent the sensor and configured to display at least one status indication associated with the biometric module.

9. The device of claim 1, further comprising at least one indicator disposed adjacent the sensor and configured to be illuminated to display at least one status indication associated with the biometric module.

10. The device of claim 1, wherein the biometric module further includes a conductive element that couples the hood to the frame, wherein the conductive element creates a conductive path from the hood to the frame for electrostatic energy while the hood moves relative to the frame.

11. An electronic device, comprising:
a biometric module that captures a fingerprint and includes:
an electrically conductive frame;
an electrically conductive hood that moves in the frame and includes a swipe-scanner that reads a fingerprint;
a biasing element that biases the hood toward a working surface of the electronic device; and
a circuit board electrically coupled to the swipe-scanner, wherein the hood and the frame are connected through a conductive element such that electrostatic energy discharges from the hood, to the frame, and to ground while the hood moves in the frame away from the working surface.

12. The device of claim 11, wherein the biometric module further comprises first and second electrical contacts, and the circuit board communicates with the swipe-scanner in response to movement of the hood away from the working surface and engagement of the first electrical contact with the second electrical contact.

13. The device of claim 11, wherein the circuit board is located in the frame and beneath the hood and the swipe-scanner.

14. The device of claim 11, wherein the biasing element is located between the hood and the circuit board.

15. The device of claim 11, further comprising a light adjacent the swipe-scanner, wherein the light illuminates when the swipe-scanner is activated to read the fingerprint.

16. The device of claim 11, wherein the hood includes electrical contacts, and the circuit board includes electrical contacts that contact the electrical contacts of the hood when the hood is moved downwardly away from the working surface.

17. The device of claim 11, wherein the biometric module comprises an indicator disposed adjacent the swipe-scanner and configured to display at least one status indication associated with the biometric module.

18. The device of claim 11, further comprising at least one indicator disposed adjacent the swipe-scanner and configured to be illuminated to display at least one status indication associated with the biometric module.

19. An electronic device, comprising:
a biometric module that includes:
a frame;
a hood that moves in the frame and includes a sensor that acquires a biometric image of a finger; and
a biasing element that biases the hood in the frame; and
an indicator adjacent the biometric module, wherein the indicator provides a visual indication that a downward force on the hood occurs and that a swiping action of the finger yields a scan of the finger to acquire the biometric image.

20. The device of claim 19, wherein the hood has a first electrical contact on a bottom surface and the sensor is located on a top surface of the hood.

21. The device of claim 19, further comprising a circuit board electrically coupled to the sensor, wherein the circuit board provides power to the sensor in response to the downward force of the hood away from a working surface of the electronic device and engagement of two electrical contacts.

22. The device of claim 19, wherein the hood and the frame are connected through a conductive element such that electrostatic energy discharges from the hood, to the frame, and to ground while the hood moves in the frame away from the working surface.

23. The device of claim 19, wherein the indicator is configured to indicate that the biometric module is ready to acquire the biometric image, and configured to indicate whether the biometric image matches a stored biometric image.

* * * * *